(12) United States Patent
Appolonia (10) Patent No.: US 9,347,108 B2
(45) Date of Patent: May 24, 2016

(54) ADVANCED TECHNOLOGY FOR IRON-CHROME ALLOYS PRODUCTION AND RELATED PLANT

(71) Applicant: Paolo Appolonia, Capo di Ponte (IT)

(72) Inventor: Paolo Appolonia, Capo di Ponte (IT)

( * ) Notice: Subject to any disclaimer, the term of this patent is extended or adjusted under 35 U.S.C. 154(b) by 43 days.

(21) Appl. No.: 14/188,972

(22) Filed: Feb. 25, 2014

(65) Prior Publication Data

US 2015/0240321 A1   Aug. 27, 2015

Related U.S. Application Data

(62) Division of application No. 13/387,628, filed as application No. PCT/IT2009/000350 on Jul. 30, 2009, now abandoned.

(51) Int. Cl.

| | |
|---|---|
| *C21C 7/00* | (2006.01) |
| *C21C 5/00* | (2006.01) |
| *C21C 5/52* | (2006.01) |
| *C21C 5/54* | (2006.01) |
| *C21B 3/04* | (2006.01) |
| *B22D 25/00* | (2006.01) |
| *B22D 41/00* | (2006.01) |
| *C22C 1/02* | (2006.01) |
| *C22C 38/18* | (2006.01) |
| *B22D 7/00* | (2006.01) |
| *B22D 29/00* | (2006.01) |

(52) U.S. Cl.
CPC ... *C21B 3/04* (2013.01); *B22D 7/00* (2013.01); *B22D 25/00* (2013.01); *B22D 29/00* (2013.01); *B22D 41/00* (2013.01); *C21C 5/005* (2013.01); *C21C 5/5264* (2013.01); *C21C 5/5294* (2013.01); *C21C 5/54* (2013.01); *C21C 7/00* (2013.01); *C21C 7/0087* (2013.01); *C22C 1/02* (2013.01); *C22C 38/18* (2013.01)

(58) Field of Classification Search
CPC .... C21C 5/005; C21C 5/5211; C21C 5/5264; C21C 5/5294; C21C 5/54; C21C 7/0087; C21C 7/00; B22D 7/00; B22D 29/00; B22D 9/06

See application file for complete search history.

(56) References Cited

U.S. PATENT DOCUMENTS

| | | | | |
|---|---|---|---|---|
| 2,937,424 | A | * | 5/1960 | Guenzi ................. B22D 7/068 249/111 |
| 3,645,708 | A | * | 2/1972 | Grady ...................... C21B 3/08 65/141 |
| 3,665,085 | A | | 5/1972 | Dumont-Fillon et al. |

(Continued)

FOREIGN PATENT DOCUMENTS

| | | | |
|---|---|---|---|
| JP | 63128111 A | * | 5/1988 |
| JP | 2008050700 A | * | 3/2008 |

OTHER PUBLICATIONS

Mizukami et al. Japanese Patent JP 2008050700 A published Mar. 2008. Machine translation.*

*Primary Examiner* — George Wyszomierski
*Assistant Examiner* — Tima M McGuthry Banks
(74) *Attorney, Agent, or Firm* — R. Ruschena Patent Agent, LLC (57) ABSTRACT

A method for producing ferro-chrome alloys comprising a stoichiometric charge and stoichiometric slag calculation step, a step of making the plant and the crucible furnace operate at normal regime, steps of casting the metal and the slag, a step of collecting the molten metal in suitable modular molds made from spheroidal graphite cast iron, a step of removing the ingots contained in the molds with suitable pincer means, a step of collecting the slag in suitable nonrefractory bells or ladles, characterized in that the metal-slag separation takes place directly inside the furnace and in that said castings of metal and slag take place in successive steps so as to allow the drawing off of the liquids in the amounts formed between one casting and the next.

4 Claims, 5 Drawing Sheets

(56) References Cited

U.S. PATENT DOCUMENTS

| | | | |
|---|---|---|---|
| 3,888,658 A * | 6/1975 | Shoupp | C21B 13/0033 75/10.37 |
| 4,119,454 A * | 10/1978 | Rath | C21C 5/5211 75/10.36 |
| 4,561,885 A * | 12/1985 | McFarlane | F27D 1/0006 501/117 |
| 5,451,035 A | 9/1995 | Roth | |
| 5,567,222 A * | 10/1996 | Takahashi | C21C 5/36 75/376 |

* cited by examiner

ADVANCED TECHNOLOGY FOR IRON-CHROME ALLOYS PRODUCTION AND RELATED PLANT

RELATED APPLICATIONS

This application is a division of the parent application Ser. No. 13/387,628, hereby incorporated by reference, filed on Jan. 30, 2012, which is a U.S. National Stage application of PCT/IT2009/000350 filed on Jul. 30, 2009 of which the applicant claims the benefits of its filing date.

The Art Unit of the parent application is 3742. This applicant claims the entitlement to micro entity status.

1. FIELD OF THE INVENTION

This patent application relates generally to a method and relative plant for the production of ferro-chrome alloys and more particularly to a method and relative plant for the production of ferro-chrome alloys that allows metal-slag separation directly inside the furnace.

2. BRIEF DESCRIPTION OF THE PRIOR ART

The present invention has as its object an innovative method and the relative plant for producing ferro-chrome alloys that allows metal-slag separation directly inside the furnace. The production of ferro-chrome does indeed present multiple difficulties such as the difficult metal-slag separation, the lack of an optimal mineral/metal conversion yield, the loss of metal in slag, the pollution with slag of the metal, the instability in electrical conduction of the furnace, as well as the excessive use of manpower and a very critical environmental microclimate. In general, in the state of the art various technologies for solving these problems are known, but they do not offer a total solution. These technologies have been adopted in particular by the Norwegian company Elkem, producer of various types of ferro-alloys. The first technology concerns the sintering of the mineral chromite. This requires the installation of a tube furnace, typical of the production of clinker (cement factories), 30 meters long, which uses enormous methane burners that in countercurrent take the temperature of the mineral to 900-950° C. at which sintering and partial enrichment of the mineral itself occur. The mineral thus enriched brings benefits in the chemical reduction of the furnace allowing a substantial saving in electrical energy (about 1500 Kwh/ton saved). However, it must be kept in mind that the energy saved in the electric furnace has already been spent in the sintering furnace. If, for example, we consider a 20 MW furnace to be fed with sintered material, about 300 tons/day of sinter will be needed. In conclusion, with the sintering of the mineral chromite, not only is electrical energy not saved but another furnace (clinker) has actually been introduced that has required a substantial economic investment, in addition to the increased manpower and maintenance costs. Indeed, it should be kept in mind that, in productions involving very high temperatures, 1000° C. and above, each plant that is introduced increases the costs and the sources of risk both in terms of management and maintenance.

Another technology known in the state of the art is casting in refractory ladles. This technique aims at separating more easily the slag from the metal thus eliminating waste. In order to be able to carry out this technique refractory ladles (large pans of the type used in steel works) and covers with a powerful methane burner at the centre are necessary. The preheating (white heat) of the ladles is carried out through the burner positioned in the cover to coincide with the casting of the ferro-chrome. The casting is then collected in said ladles that, being preheated, slow down the thickening step of the casting. The separation of the slag is carried out with skimming technique, i.e. by means of a crane the ladle, whilst suspended, is slightly inclined and the operators, with suitable scrapers, manually carry out the skimming of the surface of the casting until the total elimination of the slag. Thereafter, the metal remaining in the ladle is poured into cast iron molds that allow it to cool down. The purpose that this technique must perform is to eliminate the loss of metal in the slag but at the same time there is an increase in the costs due both to the introduction of new apparatuses that require constant maintenance, and to the substantial energy needs to heat the ladles themselves. From the operative point of view, moreover, there are no great advantages because skimming is carried out manually and is at the same time dangerous and awkward for the workers. Moreover, there is a substantial cost of the methane gas used to preheat the ladles and the relative storage and distribution plant with their respective maintenance.

In conclusion, the technology known in the state of the art is useful because it allows all available mineral resources to be exploited, but this means substantial investments in additional plants that increase the production costs of ferro-chrome. Moreover, the sintering of the mineral used by various companies such as Xstrata Merafe in which it is known as Premus Technology, does not solve the technical problem of metal-slag separation in the casting step and of the porosity and low compactness of the metal produced. The fact that it is not possible to separate the slag from the metal in the casting step ensures that they have to be separated after solidification. The heterogeneity of the chromites themselves determines a phenomenon of surface tensions of the liquid phase with it being impossible, after solidification, to have the two phases separate from one another, i.e. a commixture layer is formed between metal and slag that can no longer be separated, which determines a substantial loss of metal because it is too polluted. Moreover, with very high volumes of slag, when emptying the liquid at regular intervals (castings) there is a substantial loss of chrome oxide in slag due to the fact that chemical reduction and therefore conversion into metal is impossible. On average the chrome oxide loaded into furnace-metal conversion yields do not exceed 80-82% determining a great loss of metal that affects the production costs. The chemical-physical characteristics of chrome also do not allow easy management of the liquid in the casting step. Indeed, the high solidification temperatures of the liquid, i.e. 1500-1600° C., do not allow the separation of the slag in the casting step, as does however occur in the production of other ferro-alloys like ferro-silicon-manganese, ferro-manganese, etc.

SUMMARY OF THE INVENTION

The technical problem solved by the present finding consists in obtaining ferro-chrome alloys by carrying out the metal/slag separation directly inside the furnace. In order to obtain this result the new method for producing ferro-chrome alloys has been designed, which radically changes the casting and chemical system of the furnace, allowing a constant amount of the two liquids (metal and slag) to be kept inside the crucible. This method is based on the principle of obtaining the "clean" ferro-chrome free from slag already in the casting step, thus eliminating all of the operations and interventions that are currently necessary, after casting, to obtain clean metal. This new method also allows a good emulsion to be obtained that is essential to allow the metal just formed to degas, obtaining a metal free from blistering. In order to allow the application of the method object of the present finding it is necessary to make some plant modifications.

BRIEF DESCRIPTION OF THE DRAWINGS

These and other advantages shall be shown more clearly in the description of the process and of the relative plant for carrying it out of the invention that refers specifically to FIGS. 1 to 5, in which a preferred example embodiment of the present finding is represented, absolutely not for limiting purposes. In particular.

DETAILED DESCRIPTION OF THE INVENTION

Figure 1:
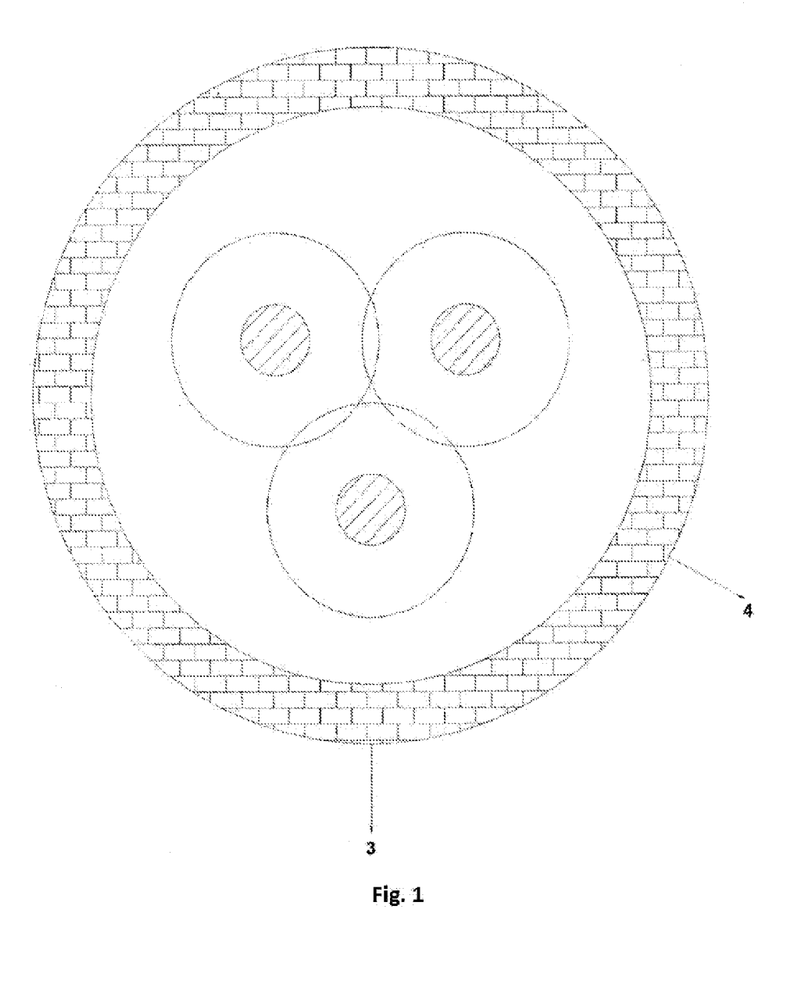
FIG. 1 shows a type of crucible of a 10 MW furnace in 1:50 scale with the three suitably sized electrodes at the centre and the offsetting of the two metal and slag casting holes.
Figure 2:
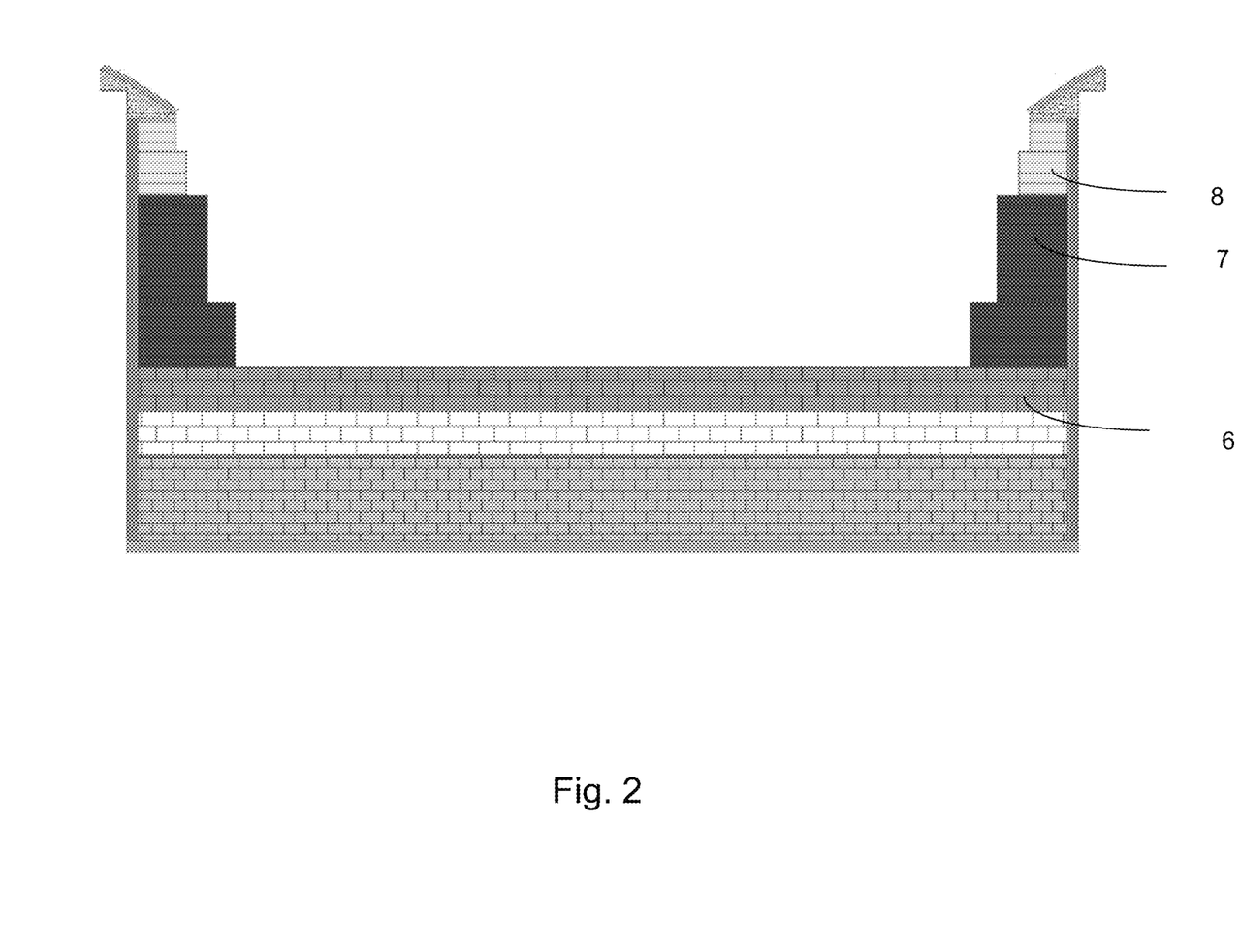
FIG. 2 shows a type of refractory material with which the crucible of the 10 MW furnace must be coated in 1:50 scale.
Figure 3:
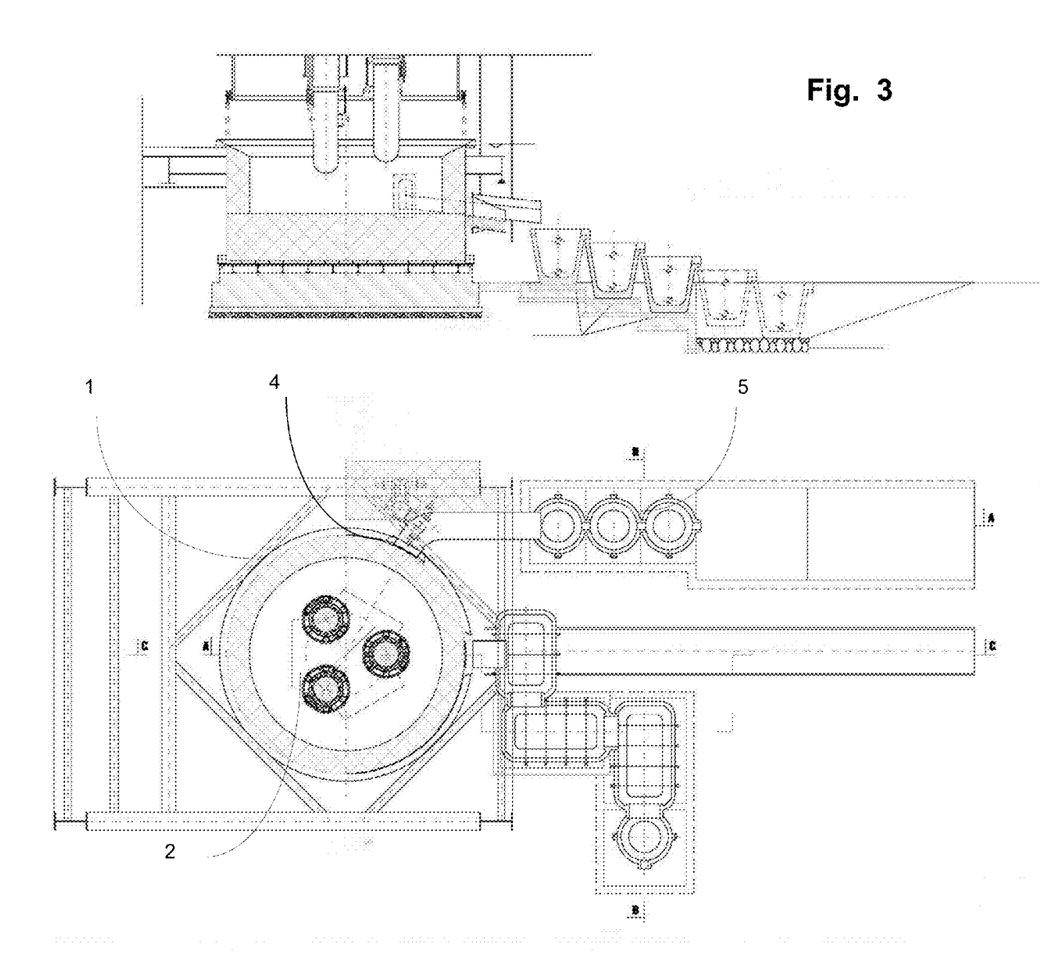
FIG. 3 shows the complete plant including the crucible with the electrodes and the tanks for emptying and collecting the slag and metal.

With reference to the aforementioned figures, the plant in object comprises a crucible furnace (1) inside which there are three Söderberg electrodes (2), a hole for casting the metal (3) and a hole for casting the slag (4), as well as a plurality of tanks for emptying and collecting the metal (5') and the slag (5). The plant is equipped with the characteristics described hereafter. The crucible must meet specific requirements of power density (watt/$cm^2$) over the useful surface and of volumetric capacity. The power density that expresses the best yield of the chemical reduction process is 23-26 watt/$cm^2$ of useful surface. Therefore, if for example we take a 10 MW furnace, we must make the following calculation: Watt 10,000,000:24 (watt/$cm^2$)=416,667 $cm^2$=cm 365 radius=365×2=730 cm+130 cm (brick wall)+20 cm (gap between bricks and structure)=880 cm, this is the ideal diameter for the crucible of a 10 MW furnace. In the system object of the present invention the volumetric capacity of the crucible must take into account the volume necessary so that the decanting of the two liquid (metal and slag) can take place within the system. Knowing that with the types of mineral having ratio 2.8-3.2 on average a ratio of metal 1:slag 1.7 is produced and that the relative specific weights are metal 7, slag 2, it follows that the slag produced occupies a volume 6 times greater than the metal produced. Therefore, a volume must be provided sufficient to allow the decanting of the two liquids, in consideration of the fact that castings with complete emptying of the crucible are no longer carried out (like in classic technology), but rather there is controlled drawing so as to allow constant permanence in the furnace of a substantial amount of the two liquids. This fact determines substantial advantages in the operation of the furnace and in the quality of the product. The constant permanence of a predetermined amount of liquid inside the furnace allows a substantial stability in electrical conductivity. In the casting step there are no significant variations in the resistivity of the charge, and therefore the system as a whole takes up a very linear progression. There are no power drops, there are no significant variations in the temperatures of the system; all of this benefits the electrical stability, the continuity of the reduction process, the perfect emulsion of the metal that by exploiting the convective effect creates homogeneity in the product drawn in the casting step with total absence of occluded gases, therefore making it perfectly compact. By determining the diameter of the crucible while respecting the power density, the available volume for the loading of minerals excluding the volume intended for containing the chemical reduction liquid is determined. All while respecting the established parameter that the power available for every meter cubed occupied by the charge is between 133 and 138 Kw, which corresponds to KJoule 497 per $m^3$ of charge, the volume occupied by the liquid that must remain constantly in the furnace will be about ⅓ with respect to the volume of the charge. In order to maintain a certain amount of liquids inside the crucible, the holes for casting metal and slag will be positioned at different heights on different axes. The hole for casting the metal will be positioned in the direction of the axis of one of the electrodes, preferably the electrode facing towards the casting pit. This will allow the metal to flow out easily. The hole will be raised by mm 50 with respect to the sole-plate and will have a diameter of mm 70. The hole for casting the slag will be shifted by 60° with respect to the hole for the metal, and exactly in the middle of the two electrodes. The slag hole will also have a diameter of mm 70. As we have already stated, the hole for casting metal is positioned in the direction of an electrode so that it is located in the influence area of the radiation of the electrode, and consequently the temperature is optimal and this ensures a correct outflow of the metal in the casting step. For the slag the casting hole is offset by 60° and will have a level shift of mm 600 (MW10), of mm 700 (MW13), of mm 800 (MW20), with respect to the height of the metal hole, because it is necessary to take out the excess slag formed in the casting intervals in a position that is not influenced by the radiation of the electrodes. It is known that the liquids in their ideal temperature phase are subjected to a circular convective motion that allows the liquid itself to be homogenised, and this can cause partial remixing of the two liquids (metal and slag), for which reason if we took out the slag in the direction of one electrode there could be seeping of metal in the slag casting step, due to possible internal turbulence. The slag casting hole offset by 60° ensures that it is possible to operate in an area not directly influenced by the electrodes and therefore not directly involved in the convective motion. From the operative point of view the castings are thus separated, and from the lower casting hole the ferrochrome free from slag is drawn, from the upper casting hole the slag free from metal is drawn. Hereafter we show the data relative to some example embodiments of the crucible, absolutely not for limiting purposes:

a) EXAMPLE 1

10 MW Furnace (FIG. 1)

Crucible height mm 4100
Crucible diameter mm 8800
Total volume of the charge: $m^3$ 73.2
Volume of the permanent liquid (Double Level): $m^3$ 23.6
Metal casting hole mm 2350 from the top of the crucible
Slag casting hole mm 1750 from the top of the crucible
Power available per $m^3$ of charge KW 136.6=Kjoule 491.75
Power density W/$cm^2$ 24
Refractory sole-plate of the crucible h mm 1700 b) EXAMPLE 2

13 MW Furnace

Crucible height mm 4500
Crucible diameter mm 9500

Total volume of the charge m$^3$ 95.4
Volume of the permanent liquid (Double Level) m$^3$ 30.9
Metal casting hole mm 2550 from the top of the crucible
Slag casting hole mm 1850 from the top of the crucible
Power available per m$^3$ of charge KW 136.2=Kjoule 490.31
Power density W/cm$^2$ 25.8
Refractory sole-plate of the crucible h mm 1900 c) EXAMPLE 3

20 MW Furnace

Crucible height mm 5000
Crucible diameter mm 11500
Total volume of the charge m$^3$ 149.1
Volume of the permanent liquid (Double Level) m$^3$ 56.7
Metal casting hole mm 2650 from the top of the crucible
Slag casting hole mm 1850 from the top of the crucible
Power available per m$^3$ of charge KW 134.1=Kjoule 482.75
Power density W/cm$^2$ 25.5
Refractory sole-plate of the crucible h mm 2300

Another essential characteristic of the method object of the present finding is the sizing of the electrodes. This is calculated taking into consideration the characteristics of the transformer that is the true heart of the furnace, since the entire plant is designed and structured according to the power (KW) and the currents (KA) of the secondary. Knowing that the coking of the electrode paste in the Söderberg electrode is very delicate and takes a long time, it is suitable for the current density per cm$^2$ of the electrode not to exceed certain values. It is known that an increase in the diameter of an electrode must correspond to a maximum desirable current density value. The established values are the following: from Ø 800 mm to Ø 1000 mm it will have to be a maximum of 7 A/cm$^2$; from Ø 1100 mm to Ø 1300 mm it will have to be a maximum of 5.5-6 A/cm$^2$ over Ø 1300 mm it will have to be a maximum of 4.5-5 A/cm$^2$. The decreased current density as the diameter of the electrode increases substantially reduces the risk of cracking and consequent breaking. Knowing that it takes an electrode between 40 and 46 hours from the moment when it comes into contact with the current-carrying plates until it comes out from the lower plates, it can be understood how delicate the coking is, which must take place with gradual increases in the temperatures transmitted by the currents without creating sudden rises (due to a high current density), which would cause splitting and cracking in the outer part of the body of the electrode, because it is in more direct contact with the temperatures of the furnace and the electric currents that struggle to be transmitted inside because the centre of the electrode is still in liquid state and therefore not very electrically conductive. In reference to what has been stated earlier, the sizing (diameter) of the electrodes depends upon the power (KW), since an increase in power corresponds to an increase in current (Ampére). Taking the 10 MW furnace as the basis for calculation, which in the secondary of the transformer will have a passage of A 45,000 for each electrode, knowing from well-established experience that it is unsuitable to exceed 7 A/cm$^2$ in the current density, we will have: A 45,000:7 (A/cm$^2$)=cm$^2$ 6428=90.4 cm Ø. We will thus have established that an electrode with a diameter of mm 900 fully meets the requirements. We test this data with the average production parameters of FeCr. Knowing that for every ton of FeCr produced with furnaces of this power (10 MW) a total of 27-28 Kg of electrode is consumed, and knowing that this furnace produces on average 50 tons/day of FeCr, gives us: 50×28=1400 Kg of electrode per day. Knowing that the specific weight of the coked electrode is 1.6 we have: cm$^2$ 6361 (electrode section)×1.6=10,177 g.=10 Kg for every centimeter of height of the section of the electrode. Hence: Kg 1400: 24 (hours):3 (electrodes)=19.4 Kg/hour of each individual electrode=1.9 cm of extension every hour for each electrode. Knowing that the electrode, when it comes into contact in the upper part of the copper plates, has an average temperature of 150° C., that the copper plates are about cm 80 high and that at the lower outlet the electrode will have achieved complete coking at a temperature of 1000° C., we will have the following data: thermal excursion of the electrode 850° C., coking time cm 80:1.9 (cm/hour)=42 hours, hourly thermal excursion 850° C.:42 hours=20° C./hour. This data confirm that the electrode will have a thermal excursion of 20° C./hour and that it can achieve perfect coking free from cracks and with excellent electrical conductivity.

Many studies published by metallurgists all around the world agree upon defining the direct area of influence by the electric arcs emanating from an electrode is equal to 3D (D=electrode diameter). It follows from this that since the centres of the electrodes are arranged at the vertices of an equilateral triangle, the three areas of influence of the electrodes will converge towards the centre. The centre distance of the electrodes varies according to the type of ferro-alloy produced. There are ferro-alloys in which the volumetric ratio between minerals and metallurgic coke is: minerals: coke=1.5:1 (productions like ferro-silicon-manganese, high carbon ferromanganese, etc.) and productions like high-carbon ferrochromium where this ratio is: minerals:coke=2.5:1 (volumetric ratio). From this datum it can be seen how the charge of the ferro-chrome is highly resistive. Of course, the centre distances of the electrodes will vary according to the resistivity of the charge. The ideal centre distance for the ferro-chrome will be worked out as follows: taking as an example the 10 MW furnace with electrodes of Ø 900 mm. As stated above the electrodes cover a circle of direct action equal to 3D, i.e. 900×3=mm 2700 or every single electrode. In working out the centre distance (centre-centre) of the electrodes, we can ensure that these areas of influence are more or less far apart or even for them to be over one another, with this of course being dependent upon the resistivity of the specific charge of a ferro-alloy. In the case of FeCr, which is produced with minerals with ratio 2.8-3.2, as already stated earlier there is a very resistive charge, for which reason we shall ensure that the areas covered by the action of the electrodes overlap at the sides for 1/12 of the action diameter (3D/12), leaving a small area uncovered at the centre of the convergence of the 3 areas. We have described how a crucible, the electrodes and their centre distance must be sized, for a correct application of the technology presented. Hereafter we shall describe what type of refractory material should cover the crucible of the furnace (FIG. 2). The types that have been successfully tested (they exceeded 4 continuous years of work of the furnace) and that have given excellent results in terms of lifetime are 5, of which 3 are used for the sole-plate and 2 for the walls (FIG. 2). The refractory material of the sole-plate of the crucible is of great importance because it ensures the seal of the entire structure of the crucible itself. It could even be said that if the sole-plate of the crucible is made refractory respecting all of the parameters of specific expansions with the suitable cardboard, it is practically indestructible given the balance that forms over time between brickwork and self crucible of the Ferro-chrome.

The cardboard positioning and the gaps suitable for promoting expansion must be managed by a refractory expert, who knows the expansion coefficients of the individual types of bricks and their permanent linear variation, and only thus can the lifetime of the sole-plate be ensured, which can easily exceed four years of work. The sole-plate is thus made refractory: the bottom of the sole-plate is insulated by a layer of 100 mm with casting of the alocast CH95 type based on 90% tabular alumina that allows excellent insulation, chemical and mechanical resistance. It is essential that the levelling be carried out horizontal. This layer can be overloaded after 7-8 days of maturing of the cast. The ceramic-bonded silico-aluminous bricks are placed adhering to the insulating cast. This layer of silico-aluminous bricks will occupy 50% of the layer of the sole-plate, in the case of the 10 MW furnace: mm 1700−100=1600:2=800 mm of silico-aluminous. The remaining thickness of 800 mm to complete the sole-plate, will be divided into two equal parts: 400 mm of layer adhering to the silico-aluminous will be of the 92% perex magnesite type bricks baked at high temperature. The last layer of 400 mm will be of the 96% perex 21 magnesite type baked at a high temperature, with high resistance to high temperatures and to slag. In these last layers of the sole-plate high quality bricks are used because they will be directly in contact with the permanent liquid layer in the furnace. The walls of the crucible are also refractory with two different qualities of bricks and with 4 different length measurements. The inner part of the crucible is divided into three well-defined areas, and each one has a well-defined role in the chemical reduction process. From the bottom to the top we have the "double level" area (6), the chemical reduction area (7) and the preheating area of the charge (8). The "double level" area (6) starts from the sole-plate and has a variable height according to the power of the furnace, for example in a 10 MW furnace the height will be mm 600. For this height the best pitch-bonded magnesite bricks will be used, which have high-purity magnesite and 50% electro-cast magnesite as components. Said bricks have a high mechanical resistance to heat and to chemical attack. These bricks have a length of mm 900 and ensure an excellent seal against the permanent liquid in the "double level" area. In the coating of the walls, the bricks will not adhere to the iron of the structure, but rather a gap of mm 100 will be created over the entire circumference from the sole-plate up to the end part of the crucible. A magnesian ramming containing 30% graphite will be placed in this gap so as to be able to discharge the excess heat accumulated by the refractory bricks as quickly as possible towards the outside. The graphite gives greater thermal conductivity, and this is to the benefit of the lifetime of the bricks. The chemical reduction area (7) is the part of the crucible most subjected to the irradiation of the electric arcs of the three electrodes, for which reason bricks of the highest quality are used, the same type as the "double level" area. The bricks will have a length of 650 mm and a variable height depending upon the power of the furnace, for example in a 10 MW furnace height 1000 mm, 13 MW height 1100 mm, 20 MW height 1200 mm. In this area between the bricks and the structure there will also be a rim of 100 mm of magnesian ramming with added 30% graphite. The last area is that for preheating the charge (8). Said area of the crucible is the least stressed one, both because the temperatures are relatively low, and because they are not subjected to the electric arcs. The type of bricks used from the analytical point of view differs little from the bricks used in the wall below, but it is not made with 50% electro-cast magnesite, and therefore it is less valuable than the previous one. However, it should be noted that the laying of the bricks must be rigorously managed by a refractory expert. In order to then keep the removal of excess heat accumulated by the bricks constant, promoted by the rim of magnesian ramming with added graphite, it is necessary to provide water cooling of the crucible. The cooling plant foresees a circular loop located in the upper part of the crucible, which distributes the water over the outer metallic wall simply as a thin film and it is collected on the bottom of the structure through channels connected to one another that will carry the water to the collection point of the whole system that concerns the circulation of cooling water of the furnace. This is a simple provision that has the purpose of preventing possible areas of overheating of the crucible, as sometimes concentrations of heat can occur caused by management anomalies of the furnace both of the electrical and of the chemical type. It can be said that this provision also acts as an alarm signal, because in the case of anomalies that continue for any length of time, the area involved by overheating causes a clear formation of steam that any worker at the furnace can easily recognise, thus allowing attention to be drawn to the phenomenon and an attempt to be made to discover its causes.

Figure 4:
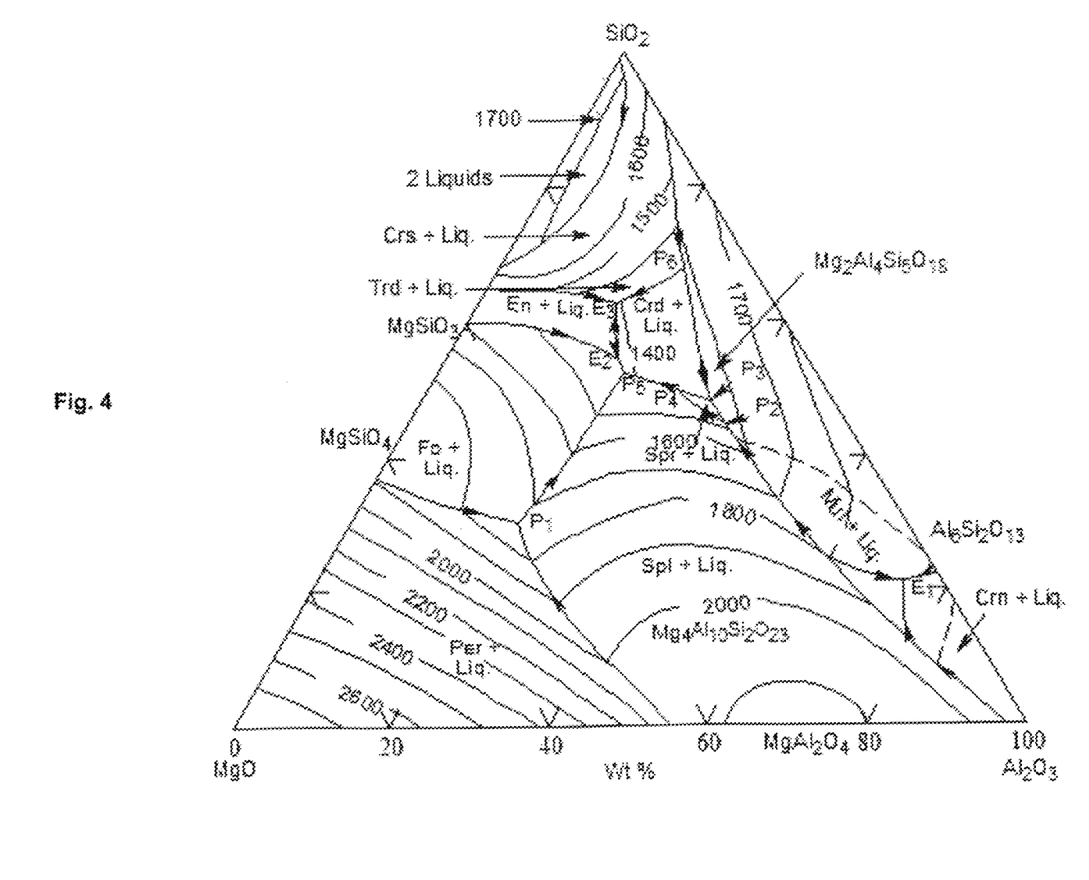
FIGS. 4 and 5 show the $SiO_2$—MgO—$Al_2O_3$ ternary diagram and $SiO_2$—MgOCaO quaternary diagram with 15% $Al_2O_3$ fixed base.
Figure 5:
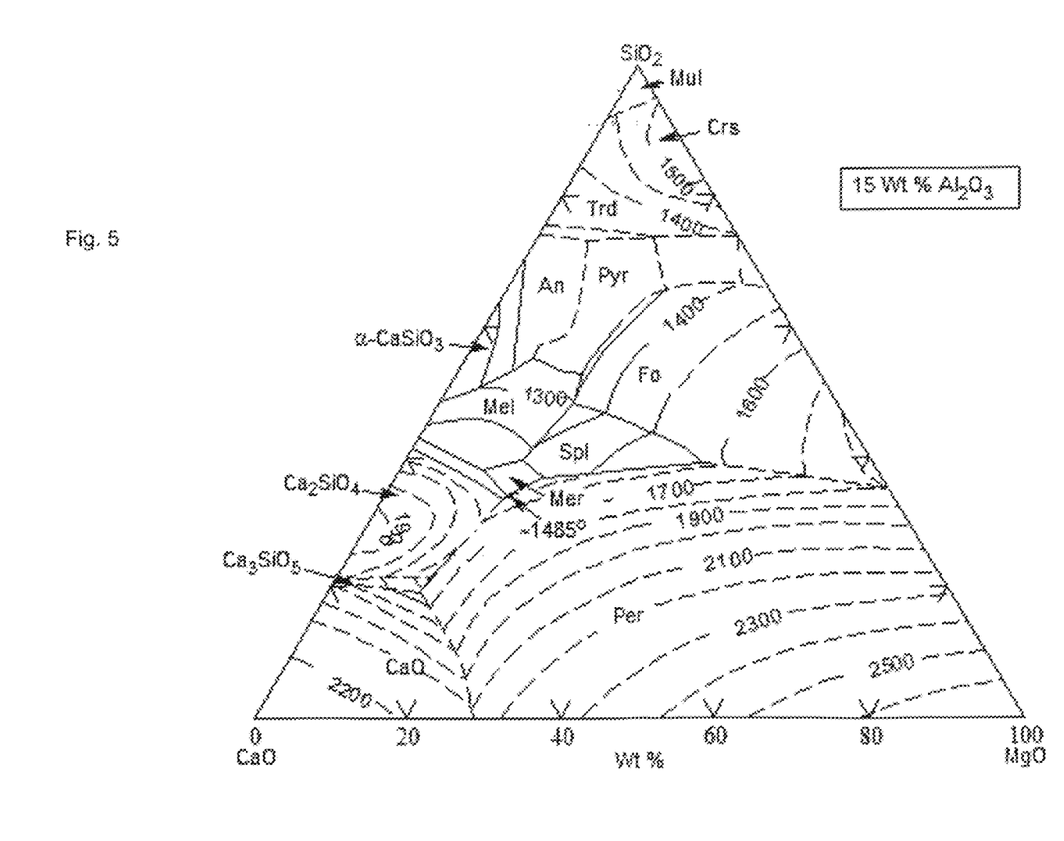

The furnace suitable for the method in object fundamentally changes only in the sizing of the crucible, in how it is made refractory, and in the formulation of the charge and of the slag that must meet the chemical-physical requirements necessary to obtain the desired results. By taking into consideration the $SiO_2$—MgO—$Al_2O_3$ ternary diagram (FIGS. 4 and 5), these three compounds form about 90% of the components of the slag. The other 10% consists of roughly 3% $Cr_2O_3$, 0.7% FeO, 1.5% CaO and other minor compounds like sulphides, phosphorus pentoxide, etc. By analysing the typical composition of the slag with high $Al_2O_3$ we will have a composition of the following type: $Al_2O_3$ 27-28%, $SiO_2$ 30% and MgO33%. These values (normalized to one hundred) projected on the ternary diagram (FIGS. 4 and 5), show a working in Spinel phase at about 1800° C. with an index of basicity (I.B.) close to 1, i.e. tending towards neutral, apart from the amphoteric behaviour of alumina which according to the case behaves as an acid or as a base. For I.B. it is common to take into consideration only the acids and bases MgO+CaO: $SiO_2$, and amphoterics are excluded. A slag of this type has two clear anomalies, i.e. high temperature and high viscosity. Indeed, a higher melting point clearly means greater electrical energy consumption and an increase in the melting speed of the charge. This subtracts a certain amount of mineral from the chemical reduction and jeopardises the gas-solid exchange which is essential to optimally exploit the oxide-metal transformation yield. Moreover, the excessive melting speed of the minerals means that a magma layer forms that wraps around the coke and hinders its reducing action. The high viscosity is another of the negative factors. As we have already seen, in the case in which there is excessive melting with respect to reduction, the high viscosity literally traps the coke preventing its gas-solid exchange action. Moreover, in the casting step this coke would all come out from the casting hole dragged by the slag that is too dense. Of course, this would lead to the stoichiometric decrease of the coke being charged with easily foreseeable consequences:

Reducer deficiency, therefore lack of reduction of the mineral and excessive slag formation at the expensive of the metal;

destabilisation in electrical conductivity.

Another negative point caused by high viscosity is that it is difficult to decant the metal from the slag both inside and outside of the crucible. The consequences are well known:

substantial loss of metal that remains caught in the slag;

pollution of slag in the metal given the difficulty of separation since the surface tensions of slag and metal are similar and they tend to co-melt on the two separation surfaces.

Therefore, the viscosity of the slag plays a fundamental role in solving this problem and hereafter we shall see how the question is resolved by studying the specific diagram. Once again taking into consideration the ternary diagram $SiO_2$—$MgO$—$Al_2O_3$ (FIG. 4) and $SiO_2$—$MgO$—$CaO$ with fixed base 15% $Al_2O_3$ (FIG. 5), we are better able to understand how to define the composition of the slag so that it can have the chemical-physical characteristics suitable for solving the problems examined earlier. In order to do this we must keep in mind the temperatures and the viscosity that will derive from them. By logical deduction of the considerations made before, we must act upon the slag so as to pass on to a smaller percentage of $Al_2O_3$ and fix the temperature of the slag at an average value of 1650° C. To obtain this result it is necessary to take a few other things into consideration. Firstly, we must consider the index of basicity (I.B.) factor. As known, chrome minerals have a high MgO (basic magnesium oxide) content, and it follows from this that the slag will have a high MgO content. We also know that MgO and CaO are notoriously fluidifying, but this is so in the case in which they act upon an acid substance like $SiO_2$ that structurally has a tetrahedral crystallisation that tends to extend in a laminar manner, is a complex bond that has difficulty flowing (low fluidity). In this specific case, the basic substances like MgO and CaO break this compact frame making the liquid very flowable (fluid). In our case, on the other hand, concerning basic substances with high melting points, we have a thickening effect due not to the crystalline structure, but rather to the high temperature, and indeed the temperature only has to be changed slightly to make these substances into thick magmas (low fluidity). At this point we discover a very interesting thing, that when there is a high percentage of basic substances (MgO—CaO) the simple addition of an acid substance like $SiO_2$ (even if in complex crystalline form) immediately obtains two positive effects: it lowers the temperature to desired values and it obtains a very strong fluidifying effect.

Finally, checking that the index of basicity, i.e. checking the magnesium and calcium oxide contents (basic) with respect to the silica content (acid) present in the base mineral, falls within the predetermined range ensures that the required fluidity and melting points are obtained. It should be noted how an increase in $Al_2O_3$ leads to an increase in viscosity. It must be considered that $Al_2O_3$ carries out its tetrahedral crystallisation action not only in the lamellar way like $SiO_2$, but also in three dimensions and therefore it gives the liquid a compact weft that is practically impenetrable even by substances with a higher specific weight. This is the negative factor that prevents the metal FeCr from decanting from its own slag. This negative factor has always created great management, quality and environmental difficulties. Regarding this, it must be kept in mind that the stoichiometric calculation of the slag formulation must be carried out specifically according to the origin of the base mineral and, in any case, respecting the following chemical-physical parameters:

melting point of around 1650° C.;

index of basicity slightly below the condition of neutrality: 0.83-0.87;

viscosity in the range 1.1-1.2 poise

Therefore the slag must have the concentration values of the various elements as expressed below:

| | |
|---|---|
| $Cr_2O_3$ | 2.5 ÷ 2.8% |
| $SiO_2$ | 42.0 ÷ 44.0% |
| $Al_2O_3$ | 12.0 ÷ 13.0% |
| MgO | 34.0 ÷ 36.0% |
| CaO | 1.0 ÷ 2.0% |
| FeO | 0.6 ÷ 0.8% |

Respecting these parameters is the fundamental condition to set the correct stoichiometric calculation of the charge, which as already stated, must take into account the characteristics of the base mineral according to its geographical origin. Simply as a non-exhaustive example, let us consider the average values of a good Chromite originating in Russia or Turkey with an average $Cr_2O_3$ content equal to 42% and with the concentration values of the various elements as expressed below:

| | |
|---|---|
| $Cr_2O_3$ | 42% |
| FeO | 11.5% |
| $SiO_2$ | 12.50% |
| $Al_2O_3$ | 8% |
| MgO | 22% |
| CaO | 1% |

Ratio 3.2:1 (ratio Cr:Fr)

With the technology object of the present finding, the oxide-metal transformation yield is around 93-94%. Slag is obtained with 2.5-2.8% $Cr_2O_3$ and considering that the amount of slag produced per ton of FeCr is 1:1.6-1.7 this means that in slag we lose (2.7×1.65) 4.5% $Cr_2O_3$. We also know that the smoke produced by the furnace (dust) collected by the purifiers is on average 30-35 Kg for 1 ton of FeCr, and that this smoke contains about 30% $Cr_2O_3$, and therefore there are 11 Kg $Cr_2O_3$ for 1 ton of FeCr equal to 1.1%. The sum of the losses is 5.6%, with a little unquantifiable loss, and assuming 93% as oxide-metal transformation yield is per se precautionary.

Below we display the stoichiometric calculation taking into account the values of the slag composition shown above and the analysis of a typical FeCr alloy:

| typical FeCr analysis | | | | | |
|---|---|---|---|---|---|
| Chromo | Carbon | Silicon | Sulphur | Phosphor | Iron |
| 64.0-66.0% | 7.0% | 1.5% max | 0.040% max | 0.030% max | 23% |

The calculation for 1 ton of FeCr is thus:

Cr 655:0.6842 (Cr/$Cr_2O_3$)=Kg 957 $Cr_2O_3$:0.93 (yield)=Kg 1029 $Cr_2O_3$ Kg 1029:0.42 (% $Cr_2O_3$)=2450 Kg Chromite/ton FeCr The amounts of raw materials shown in the various calculations are referred to an anhydrous, dry, without humidity status; the humidity will be calculated separately for each individual raw material.

From the stoichiometric calculation relative to the mineral components consisting of Chromite, Coke, Quartz and coats of the Söderberg electrodes, it is possible to obtain the general table of composition of the charge:

| Minerals | Kg | Fixed carbon Kg | $Cr_2O_3$ Kg | FeO Kg | $SiO_2$ Kg | $Al_2O_3$ Kg | MgO Kg | CaO Kg |
|---|---|---|---|---|---|---|---|---|
| Chromite | 2.450 | / | 1029 | 282 | 306 | 196 | 539 | 24 |
| Coke | 420 | 361.3 | / | 15 | 19 | 5 | / | 10 |
| Quartz | 400 | / | / | 8 | 380 | 4 | / | / |
| Söderberg electrode coats | | / | / | 7 | / | / | / | / |
| TOTALS | | 361.3 | 1029 | 312 | 705 | 205 | 539 | 34 |

From the calculation of the Coke necessary for the reduction we have the following analysis:

| Ash | 10-11% | Analysis of the ash | FeO | 30% |
|---|---|---|---|---|
| Volatile substances | 1-2% | | $SiO_2$ | 40% |
| Sulphur (S) | 0.7-1% | | $Al_2O_3$ | 10% |
| Phosphor (P) | 0.030% | | CaO | 20% |
| Fixed Carbon | 86% | | | |
| Cr Kg 660 × 0.346 (1.5 C/Cr) | | | Kg C fixed 228.4 | |
| Fe Kg 230 × 0.215 (C/Fe) | | | Kg C fixed 49.5 | |
| Si Kg 15 × 0.857 (2C/Si) | | | Kg C fixed 12.8 | |
| C in alloy 7% | | | Kg C fixed 70 | |
| Total | | | Kg C fixed 361.3 | |

C Fixed Kg 361.3:0.86=Kg 420 anhydrous coke

Now we have to determine the characteristics of the slag to be produced, i.e. a Forsterite with temperature of 1650° C. and with I.B. (Basicity Index) 0.85, therefore the basic elements of the table are:

MgO Kg 539

CaO Kg 34

Basic materials total Kg 573

Now we shall calculate the amount of SiO□ (Quarzite) necessary for the process:

Basic materials Kg 573:0.85 (I.B.)=674 Kg SiO□ for the slag

32 Kg SiO□ which reduce into Si in the alloy

706 Kg SiO□ necessary

Kg 706−306 (supplied by the Chromite)−19 (by the Coke)=Kg 381

Kg 381: 0.95 (average content in a Quarzite)=Kg 400 of anhydrous quartzite to be added to the charge.

From the general table of the components it is also possible to obtain their distribution in the ferro-alloy and how much flows in the slag and in the smoke.

| | Totals | Reducer | In alloy | In slag | In smoke |
|---|---|---|---|---|---|
| $Cr_2O_3$ | 1029 | / | 964 | 44 | 12 |
| C Fixed | 361.3 | 291.3 | 70 | / | / |
| FeO | 312 | / | 297 | 11 | 4 |
| $SiO_2$ | 705 | / | 32 | 668 | 5 |
| $Al_2O_3$ | 205 | / | / | 202 | 3 |
| MgO | 539 | / | / | 534 | 5 |
| CaO | 34 | / | / | 33 | 1 |
| | | | | 1492 | 30 |

The ferro-alloy will thus be made up as follows:

$Cr_2O_3$ 964×0.6842=Cr 660

C 70

FeO 297×0.777=Fe 230

$SiO_2$ 32×0.466=Si 15

The slag will be made up as follows:

| $Cr_2O_3$ | 44 | 2.8% |
|---|---|---|
| FeO | 11 | 0.7% |
| $SiO_2$ | 668 | 42.5% |
| $Al_2O_3$ | 202 | 12.9% |
| MgO | 534 | 34% |
| CaO | 33 | 2.1% |

Kg 1492+5% of oxides not classified but contained in the raw materials such as Sodium oxide, Potassium, sulphides, Phosphates, the total of the slag will be Kg 1.570.

$$I.B. = \frac{MgO\ 34{,}0 + CaO\ 2{,}1}{SiO_2\ 42{,}5} = 0.847$$

The basicity index was respected.

The setting up of a furnace requires special care because the entire brickwork must be allowed to get up to temperature with a certain graduality to allow the suitable dilations. From this derives the need to graduate the supply of energy and the feeding of the first charges into the furnace, so that the whole system does not undergo sudden and localised thermal shocks. Once normal operating conditions have been reached, the metal and slag castings can be programmed in alternate steps so as to allow the liquids to be drawn off in the amounts formed between one casting and the other. The perforation is carried out in the metal casting hole (the lower one) already having the tap-hole machine ready and the pure metal, free from slag, is left to flow into the suitable modular molds (5) made of spheroidal graphite cast iron positioned in cascade (FIG. 3). When the amount of ferro-alloy drawn has reached the set level in the crucible, there will be a trickle of slag that starts to be transported by the metal flowing out, and at that precise moment the tap-hole is made with the machine already provided. Ferro-chrome free from slag and perfectly emulsioned (compact) will have thus been obtained.

The castings of the metal are collected in suitable modular molds made of spheroidal graphite cast iron that, after about 2 hours, will allow us to remove the ingot contained in the mold with a suitable pincer attached to the overhead crane. The modular molds offer great advantages because they allow the individual pieces (front, central, rear) that over time can decarburize and thus crack, to be replaced without having to replace the entire mold. It is a simple maintenance intervention that leads to savings in production costs. With the same intervals, but at staggered times with respect to the metal, the casting of the slag is carried out from its hole arranged at a higher level than that for the metal and offset by 60°. The slag casting does not have special provisions during its drawing off, it is left to flow and is collected in the suitable bells (non-refractory ladles) made of spheroidal graphite cast iron arranged in cascade. When all of the liquid exceeding the level of the slag casting hole has flowed out, the casting also automatically finishes and simple plugging is carried out. In doing so an amount of liquids (metal and slag) will always remain in the furnace, which will ensure stability in electrical conductivity and power, and the metal-slag separation can thus occur and, promoted by the circular convective movement of the liquids at high temperature, the degassing and emulsion of the metal will take place. With the application of the described method, the casting area becomes more comfortable and safer because there are no longer movements of molds containing Ferro-chrome that are transported and tipped, but rather a simple picking up of the ingot through a pincer that places it in the cooling area. This gives two positive factors: the lack of movement and tipping of the molds means a substantial decrease in mechanical stress at a high temperature that translates into a longer lifetime of the molds (therefore a saving); tipping produces a substantial formation of metallic micro-dusts at a high temperature that, although protective masks can be adopted, still creates an environment with a highly polluted microclimate, and this also applies considering the fact that there is no longer any metal-slag separation operation either in liquid phase or in solid phase.

This is without doubt one of the main benefits that derive from it with the application of the technology in object. The environmental factor takes on great importance also in terms of the staff and substantially reduces the risk of professional illness.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. Method for producing ferro-chrome alloys comprising a stoichiometric charge and a stoichiometric slag calculation step, a step of making a plant and a crucible furnace to operate, steps of casting of metal and slag, a step of collecting molten metal in modular molds made from spheroidal graphite cast iron, a step of removing ingots contained in modular molds using pincer means, a step of collecting the slag in non-refractory bells or ladles, wherein metal-slag separation takes place directly inside said furnace and wherein said castings of metal and slag take place in successive steps so as to allow tapping in an amount formed between one casting and the next; and wherein said slag is made up of:
   $Cr_2O_3$ in a concentration between 2.5-2.8% of slag volume,
   $SiO_2$ in a concentration of between 42.0-44.0% of slag volume,
   $Al_2O_3$ in a concentration of between 12.0-13.0% of slag volume,
   MgO in a concentration of between 34.0-36.0% of slag volume,
   CaO in a concentration of between 1.0-2.0% of slag volume,
   FeO in a concentration of between 0.6-0.8% of slag volume.

2. Method according to claim 1, wherein, when an amount of drawn of ferro-alloy has reached a set level in the crucible and there is a visible trickle of slag that begins to be transported by flowing metal, a metal casting hole is plugged with a machine that has already been set up.

3. Method according to claim 1, wherein said stoichiometric slag calculation step requires that the following chemical-physical parameters: melting point around 1650° C.; basicity index slightly below the condition of neutrality, between 0.83-0.87; viscosity within a range of 1.1-1.2 poise.

4. Method according to claim 2, wherein a volume amount of drawn of ferro-alloy contained in the crucible is ⅓ of the volume of the charge.

* * * * *